UNITED STATES PATENT OFFICE.

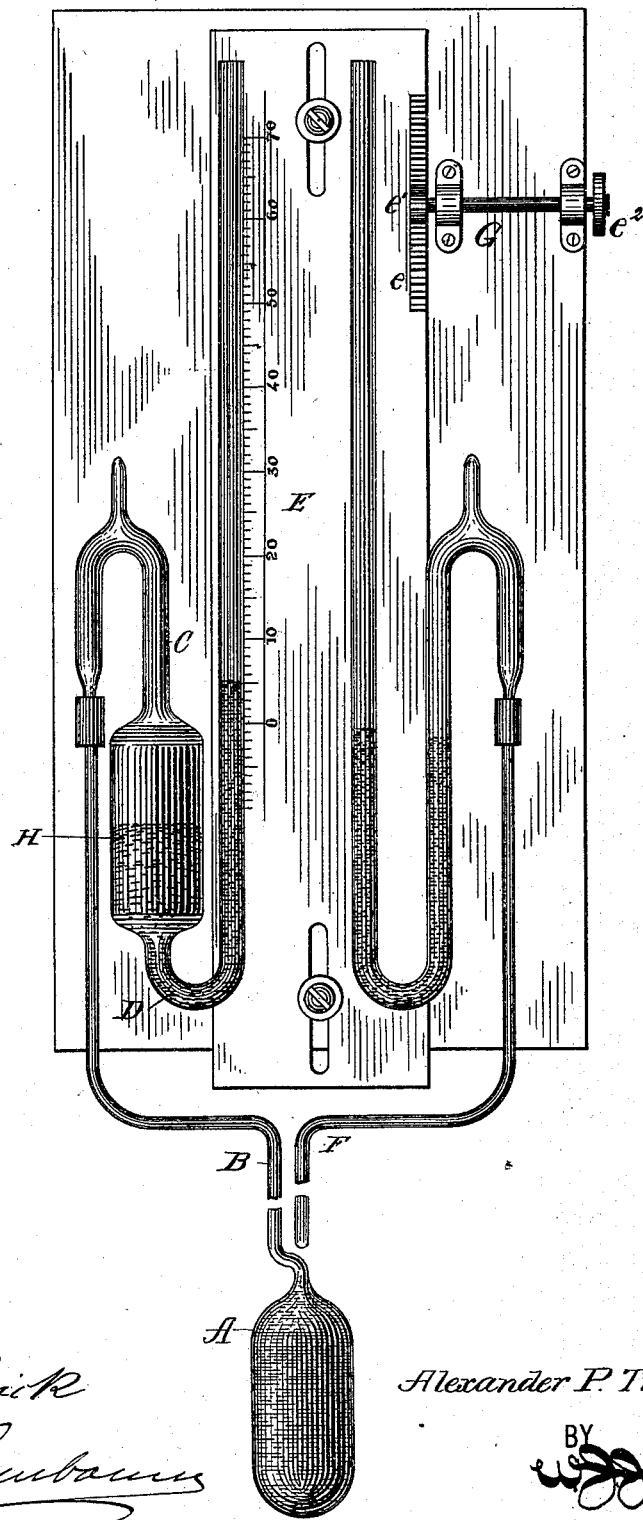

ALEXANDER PELHAM TROTTER, OF WESTMINSTER, COUNTY OF MIDDLESEX, ENGLAND.

THERMOMETER.

SPECIFICATION forming part of Letters Patent No. 416,875, dated December 10, 1889.

Application filed October 26, 1888. Serial No. 289,205. (No model.)

*To all whom it may concern:*

Be it known that I, ALEXANDER PELHAM TROTTER, a subject of the Queen of Great Britain, residing at 2 Victoria Mansions, Westminster, county of Middlesex, England, have invented certain new and useful Improvements in Indicating-Thermometers, of which the following is a specification.

My invention relates to thermometric apparatus.

The object of the invention is to provide an apparatus by means of which the temperature of an apartment or chamber may be determined with accuracy at a point distant from the chamber or apartment. For instance, a refrigerating-chamber may be located in the cellar or some extreme portion of the building, in which case it is desirable that the temperature of the chamber may be ascertained in the office of such building, or in some portion of the building remote from the chamber.

The apparatus which I have invented consists of a bulb or vessel containing an expansible liquid located in the chamber whose temperature it is desirable to register. This bulb is connected with a tube of fine bore, which leads thence to the point where it is desired the indications may be read. This construction is nothing more or less than the ordinary thermometer-tube extended in length. It is obvious that that portion of the tube which extends from the chamber to the office will be subjected to the temperature or temperatures of the space or spaces through which it passes, and that such temperatures will affect the indications of the instrument. It is of course desirable that means be provided for compensating for the variations due to the temperatures to which the tube is exposed. I have provided means whereby such compensation is made, which consists of a second thermometric tube similar to the first-mentioned tube, which is exposed only to the temperatures affecting the main tube at the points intermediate of the chamber and office. By first ascertaining the indications of the compensating tube it is a simple matter to determine the temperature of the chamber, inasmuch as the operation would then simply consist in calculating the difference between the two indications. My invention, however, does not leave it to the operator to calculate this difference, inasmuch as it comprehends an adjustable scale a point on which may be set opposite the surface of the liquid in the compensating tube, and the degrees either one side or the other of said point at which the surface of the liquid in the main tube stands will indicate the temperature of the chamber or apartment which it is desirable to ascertain.

To explain my invention in detail, I refer to the accompanying drawing, in which the figure represents a face view of the apparatus.

A represents a bulb of considerable size, which is to be located in the chamber or apartment whose temperature is to be indicated.

B represents a tube of fine bore of indefinite length, but extending from the bulb A to the office or point at which it is desired the indications may be read. Adjacent to the office end of the tube a scale E is placed. This scale is divided into degrees in the usual manner, which are marked upon a plate provided with a rack $e$, with which meshes a pinion $e'$ on the end of a shaft G. The opposite end of the shaft is fitted with a button or crank $e^2$, by means of which it may be rotated to cause a movement in either direction of the scale-plate.

The compensating element consists of the tube F, containing the same kind of liquid as is contained in the tube B. This tube begins outside of the wall or partition of the chamber containing the bulb A and extends parallel to the two and closely adjacent to the tube B throughout its full length. The office end of the tube F stands side by side with the office end of tube B in front of the scale-plate E. The tubes F and B are made as nearly alike in every particular as possible. Now, it is obvious that the temperature or temperatures to which the tubes B and F are exposed will cause equal variations in the heights of the columns of liquid in each tube, and, inasmuch as the liquid in tube B is also subjected to the temperature of the chamber in which bulb A is located, there may be a difference between the heights of the liquid in the two columns, and this difference in the height will indicate the true temperature of the chamber.

In order to take a reading of the instrument, the operator by means of the rack-and-pinion mechanism described moves the scale-plate until the zero-point or some other indicating-point on the scale stands opposite the surface of the liquid in the tube F. He then notes the number of degrees above or below such point at which the surface of the liquid in the tube B stands. This is the indication of the temperature in the chamber containing bulb A.

When it is desired that rapid changes of temperature shall be indicated, the form of the bulb A may be that of the long tube coiled in a helix or spiral, and when it is desired that the mean temperature of the chamber may be indicated this tube may be run along the walls or ceiling or suspended in the chamber.

At the scale end of the two tubes I attach to each a tube C, preferably of glass, of an internal diameter such that the motion of the free surface of the fluid may be of convenient amplitude. In order to prevent the evaporation of the fluid, I prefer to make the tube C U-shaped and fill it partly with mercury, as indicated by D. The surface of the mercury may be used for reading against the scale. In this way, also, the fluids, which may be spirits, are subjected only to the slight pressure of the columns of mercury in the U-tubes or to any difference of height between the different parts of the apparatus. There is therefore less chance of leakage than if considerable pressure were used. This chance of leakage is still further prevented by the use of bulb H, which prevents great differences of pressure. The weight of the spirits above the surface of the mercury in this bulb counteracts the back-pressure of mercury in the U-tube.

Having described my invention, I claim—

1. In a thermometric apparatus for transmitting indications, the combination, with a vessel or bulb of fluid exposed to the temperature to be measured, of a scale located at a distance therefrom, and a tube connecting with said vessel and extending into proximity to the scale in order that the degrees of fluctuation may be read from the scale, all in combination with a compensating tube of the same diameter and length of the above-mentioned tube and extending alongside the same, as described.

2. Two tubes of fine bore and of the same length extending side by side from the location where temperature is to be measured to the point where the temperature is to be indicated, one of said tubes having an enlargement at said location and both tubes containing a liquid, as set forth.

3. In a thermometric transmitting apparatus, a scale located at the point where temperature is to be read, two tubes of equal length and diameter extending from said scale and running side by side to the location where the temperature is to be measured, an enlarged vessel connected with the end of one of said tubes at said location, and an expansible fluid in each tube and the vessel.

4. Two tubes of fine bore and of the same length extending side by side from the location where temperature is to be measured to the point where the temperature is to be indicated, one of said tubes having an enlargement at said location and both tubes containing a liquid, a scale located at the point where the temperature is to be indicated, said scale being adjustable, so that a division-mark on the same may be moved into line with the liquid in one of the tubes.

5. Two tubes of fine bore and of the same length extending side by side from the location where temperature is to be measured to the point where the temperature is to be indicated, one of said tubes having an enlargement at said location, both tubes being formed into a U shape at the point where the temperature is to be indicated, a quantity of mercury in each U, and a fluid in each tube, whereby the expansion of the fluid in the tubes will cause pressure upon the mercury in one side of the U.

In witness whereof I have hereunto signed my name in the presence of two subscribing witnesses.

ALEXANDER PELHAM TROTTER.

Witnesses:
  AMBROSE FISK,
*Notary's Clerk, 5 Waterloo Place, S. W., London.*
  TOB. G. RIDGWAY,
*Not. Pub., 5 Waterloo Place, S. W., London.*